(12) United States Patent
Schueler

(10) Patent No.: US 10,518,668 B2
(45) Date of Patent: Dec. 31, 2019

(54) HEIGHT-ADJUSTABLE VEHICLE SEAT HAVING A CRASH BLOCKING UNIT

(71) Applicant: Adient Luxembourg Holding S.à.r.l., Luxembourg (LU)

(72) Inventor: Rolf Schueler, Heiligenhaus (DE)

(73) Assignee: Adient Luxembourg Holding S.à. r.l., Luxembourg (LU)

( * ) Notice: Subject to any disclaimer, the term of this patent is extended or adjusted under 35 U.S.C. 154(b) by 139 days.

(21) Appl. No.: 15/740,594

(22) PCT Filed: Jun. 16, 2016

(86) PCT No.: PCT/EP2016/063921
§ 371 (c)(1),
(2) Date: Dec. 28, 2017

(87) PCT Pub. No.: WO2017/001206
PCT Pub. Date: Jan. 5, 2017

(65) Prior Publication Data
US 2018/0194249 A1    Jul. 12, 2018

(30) Foreign Application Priority Data

Jun. 30, 2015 (DE) .................. 10 2015 212 238
Nov. 4, 2015 (DE) .................. 10 2015 221 563

(51) Int. Cl.
*B60N 2/16* (2006.01)
*B60N 2/42* (2006.01)

(52) U.S. Cl.
CPC ......... *B60N 2/1615* (2013.01); *B60N 2/4221* (2013.01); *B60N 2/43* (2013.01)

(58) Field of Classification Search
CPC ....... B60N 2/1615; B60N 2/4221; B60N 2/43
(Continued)

(56) References Cited

U.S. PATENT DOCUMENTS

| 5,556,159 A | * | 9/1996 | Canteleux | ................ B60N 2/16 |
| | | | | 297/216.1 |
| 5,882,080 A | * | 3/1999 | Houghtaling | .......... B60N 2/433 |
| | | | | 297/216.1 |

(Continued)

FOREIGN PATENT DOCUMENTS

| DE | 100 25 675 A1 | 12/2001 |
| DE | 100 56 082 A1 | 5/2002 |

(Continued)

*Primary Examiner* — Mark R Wendell
(74) *Attorney, Agent, or Firm* — McGlew and Tuttle, P.C.

(57) ABSTRACT

A vehicle seat (101, 201), includes a seat height adjusting multi-bar linkage (4) with five transmission links (5, 6, 7, 8, 9), operative in normal operation as a four-bar linkage based on a locking unit (10) acting between at least two transmission links (7, 8). In the event of a crash a crash blocking unit (121) locks a vehicle-structure-fixed frame (5) and a rocker (8) to each other, such that the multi-bar linkage (4) acts as a three-bar linkage. A transmission link (7) is arranged between the frame (5) and the rocker (8). In the event of a crash, the multi-bar link (4) acts as a five-bar linkage because of a load-controlled release of the locking unit (10), whereby locking of the crash blocking unit (121) can be triggered independently of a load-controlled release of the locking unit (10) by an inertia-controlled pawl (125) of the crash blocking unit (121).

11 Claims, 4 Drawing Sheets

(58) Field of Classification Search
USPC .... 297/344.15, 216.1, 216.19, 216.16, 216.2
See application file for complete search history.

(56) References Cited

U.S. PATENT DOCUMENTS

| | | | | |
|---|---|---|---|---|
| 6,478,378 | B2* | 11/2002 | Muhlberger | B60N 2/1615 |
| | | | | 297/216.1 |
| 6,921,133 | B2* | 7/2005 | Taoka | B60N 2/2803 |
| | | | | 297/216.11 |
| 7,044,543 | B2* | 5/2006 | Schumann | B60N 2/1685 |
| | | | | 297/216.1 |
| 7,338,118 | B2* | 3/2008 | Ichikawa | B60N 2/071 |
| | | | | 297/216.1 |
| 2001/0045766 | A1* | 11/2001 | Deptolla | B60N 2/4221 |
| | | | | 297/216.2 |
| 2003/0213885 | A1* | 11/2003 | Schumann | B60N 2/1615 |
| | | | | 248/419 |
| 2005/0134099 | A1 | 6/2005 | Masutani | |

FOREIGN PATENT DOCUMENTS

| | | |
|---|---|---|
| DE | 100 56 082 B4 | 9/2004 |
| WO | 01/12460 A1 | 2/2001 |
| WO | 2004/074037 A1 | 9/2004 |

* cited by examiner

HEIGHT-ADJUSTABLE VEHICLE SEAT HAVING A CRASH BLOCKING UNIT

CROSS REFERENCE TO RELATED APPLICATIONS

This application is a United States National Phase Application of International Application PCT/EP2016/063921, filed Jun. 16, 2016 and claims the benefit of priority under 35 U.S.C. § 119 of German Applications 10 2015 212 238.7, filed Jun. 30, 2015, and 10 2015 221 563.6, filed Nov. 4, 2015, the entire contents of which are incorporated herein by reference.

FIELD OF THE INVENTION

The invention relates to a vehicle seat, in particular motor vehicle seat, comprising at least one multi-bar linkage for adjusting the seat height, said multi-bar linkage being defined by at least five transmission links, wherein, during normal operation of the vehicle seat, the multi-bar linkage is effective as a four-bar linkage because of a locking unit effective between at least two transmission links of the at least five transmission links, and a crash blocking unit which, in the event of a crash, locks at least one frame, which is fixed on the vehicle structure, and rocker, as two of the at least five transmission links, to each other in such a manner that the multi-bar linkage acts as a three-bar linkage, wherein a further transmission link of the at least five transmission links is arranged between the frame and the rocker, and wherein, in the event of a crash, because of a load-controlled unlocking of the locking unit the multi-bar linkage can initially act as a five-bar linkage, as a result of which locking of the crash blocking unit can be triggered.

BACKGROUND OF THE INVENTION

The prior art discloses height-adjustable vehicle seats in which a belt buckle is co-moving, that is to say participates in the movement of the height adjuster in order, for example, in the case of a belt retractor which is blocked because of an abrupt movement and subsequent electric adjustment of the seat height upward, to avoid an uncomfortably high force between belt and occupant. Since the belt buckle of the vehicle seat is generally arranged on the inner side of the vehicle (tunnel side), but the geared motor required for an electric adjustment can customarily not be placed on the tunnel side for construction space reasons, the force introduced into the height adjuster by the belt buckle is transmitted over the entire rigidity of a substructure of the vehicle seat from the tunnel side onto the outer side of the vehicle (sill side) and absorbed there by a geared motor which is configured to be self-locking. Due to these spatial conditions and the rigidity of only a finite magnitude of the vehicle seat components located in the force flux, during an introduction of load via the belt into the belt buckle, a significant travel of the belt buckle is produced in the load direction, which travel, under some circumstances, results in an undesirably great movement of the occupant relative to the rest of the vehicle interior. In order to solve this problem, what are referred to as crash blocking units are known from the prior art, said crash blocking units being installed on the tunnel side of the seat, i.e. in the direct vicinity of the belt buckle, and, in the event of loading of the belt buckle, providing an additional stiff connection within height adjuster kinematics. Said crash blocking units generally block the rotational movement between a seat rail and rear rocker, coupled to the seat rail, of the height adjuster kinematics.

A corresponding crash blocking unit is known from WO 2004/074037 A1. An insertion movement, which is forced kinematically under a crash loading, of a pawl coupled to a rear rocker into the toothing of a tooth segment connected to the seat rail causes a blocking of the rotational movement between the rear rocker and the seat rail as a function of the load. Although the crash blocking unit according to WO 2004/074037 A1 significantly reduces the travel occurring upon loading of the belt buckle with a high force, in the event of particularly soft seat substructures a necessary deformation of the vehicle seat that is required for triggering the crash blocking unit can be quite high, particularly since the loadings which occur during the normal driving mode can lead to elastic deformations which, however, are not yet intended to allow the crash blocking unit to be triggered. In order to suppress triggering under use loads, the triggering threshold of the crash blocking unit has to be selected to be appropriately high, but this results in a later engagement in the event of a crash and therefore in an undesirably large relative movement of the belt buckle.

DE 100 56 082 B4 discloses a solution in which a system which blocks as a function of deceleration can be additionally activated as a function of load. A belt connection point is mounted movably, and a relative movement, which arises under loading, between the belt connection point and a seat frame is transmitted by means of a cable to a catch fixed on the seat rail.

SUMMARY OF THE INVENTION

An object The invention is based on the problem of improving a height-adjustable vehicle seat with a crash blocking unit of the type mentioned at the beginning The invention is based in particular on the problem of carrying out the mutually contradictory requirements regarding functional reliability in the driving mode and a low triggering threshold of the crash blocking unit in the event of a crash without a significantly higher outlay on components or on construction space compared to the prior art, in particular compared to a vehicle seat known from WO 2004/074037 A1, being required.

Owing to the fact that the crash blocking unit is lockable by an inertia-controlled pawl of the crash blocking unit independently of a load-controlled unlocking of the locking unit, the crash blocking unit can be activated in two different ways, namely both as a function of load and also under inertia control. The vehicle seat known from WO 2004/074037 A1 can therefore obtain additional inertia-controlled locking.

In the event of a crash, the multi-bar linkage can preferably become a rigid three-bar linkage by means of an inertia-controlled pawl of the crash blocking unit without the multi-bar linkage previously becoming a five-bar linkage. As a result, the crash blocking unit can lock even at the beginning of a front crash, even before the belt forces can trigger load-controlled locking.

The multi-bar linkage for load-controlled locking of the crash blocking unit preferably has a control rocker and a carrier rocker which are normally locked to each other by means of a locking unit, and therefore the multi-bar linkage, which is configured as a five-bar linkage, acts as a four-bar linkage, as considered kinematically. The locking unit keeps the control rocker and a carrier rocker locked in the front crash until a limit force acting on the vehicle seat is exceeded. If the limit force is exceeded, the locking unit opens and the multi-bar linkage acts temporarily as a five-bar linkage. As a result, the control rocker and the carrier rocker rotate relative to each other until the pawl becomes effective and locks the multi-bar linkage to form a three-bar linkage. The rocker which is lockable by the locking unit to the frame fixed on the vehicle structure so as to form a three-bar linkage is preferably the carrier rocker. A carrier rocker is intended to be understood as meaning a rocker which carries a further component, in particular carries a pawl which is arranged in particular between two outer hinge points of the rocker.

In the event of a crash, the pawl preferably enters a toothed segment, as a result of which the three-bar linkage arises. The toothed segment can be fastened to a frame, for example to an upper rail of a pair of seat rails serving as a longitudinal adjuster. The pawl can be mounted pivotably on the carrier rocker, in particular by means of a pawl bearing pin. The pawl can be mounted rotatably about a pawl axis of rotation. The pawl can be mounted on the carrier rocker so as to be rotatable about a pawl axis of rotation.

According to the invention, the pawl is additionally under inertia control, and therefore the pawl of the crash blocking unit can also lock to the toothed segment because of inertia forces without the control rocker and the carrier rocker having to rotate relative to each other for this purpose. The locking unit effective between control rocker and carrier rocker can remain locked during the inertia-controlled locking of the pawl.

The mass center of gravity of the pawl is arranged eccentrically with respect to a pawl axis of rotation of the pawl. For this purpose, the pawl can have an additional mass, in particular in comparison to pawls, which are known from the prior art, for crash blocking units. The additional mass can be fastened to the pawl. The additional mass can be formed integrally with the pawl.

The control rocker can preferably have a journal which can control a rotation of the pawl relative to the carrier rocker as a function of a relative angle between the control rocker and the carrier rocker. For this purpose, the pawl preferably has an opening or a depression, in particular a control groove, in which the journal engages. The journal can engage in the opening or depression in at least one direction of rotation of the pawl with a decoupling play. When the locking unit is unlocked and the carrier rocker rotates relative to the control rocker in at least one direction of rotation, the journal can bring about meshing of the pawl with the toothed segment. In an opposite direction of rotation of the pawl, which leads in particular to meshing between a toothing region of the pawl and a toothed segment region of the toothed segment, the pawl is preferably decoupled from the journal. As a result, the pawl can lock under inertia control. The journal can be deployed integrally from the control rocker. The journal can be fastened, in particular riveted, to the control rocker. The control journal can be a pin. The control journal can carry a bushing, in particular plastics bushing, which is arranged between the journal and the pawl and thereby in particular avoids noise production.

The pawl can be arranged axially between the rocker and a reinforcing plate. The reinforcing plate can be fixedly connected to the carrier rocker, for example by means of a spacer piece or spacer ring. The strength of the crash blocking unit can be increased as a result.

To sum up, the vehicle seat according to the invention solves a basic problem which arises from the fact that, during a crash, in particular front crash, a sufficiently high belt load for triggering a crash blocking unit known from the prior art (and therefore the triggering threshold for a load-controlled crash blocking unit) is reached only when the occupant is already held back by the belt. However, the actual physical cause for the processes proceeding in a certain sequence during the crash is the vehicle deceleration which is provided, as it were, as a temporally first available physical variable and can be used to already activate the crash blocking unit in time before the belt loads occur. As an alternative to the load-controlled crash blocking units, acceleration-activated mechanisms are known, for example from DE 100 56 082 B4, which either release a prestressed insertion mechanism when a limit acceleration is exceeded, or, in the simplest case, overcome a spring force which always acts in an opening manner on the mechanism for as long as the acceleration is effective. A crash blocking unit with release of a prestressed insertion mechanism has the advantage that, after triggering, the blocking element is permanently acted upon in the closing direction and therefore an optionally temporarily occurring head on head position of the components to be brought into meshing is overcome after a minimum relative movement. However, a crash blocking unit of this type has the disadvantage that the insertion mechanism, for its part, has to be secured against unintentional triggering during the production and installation phase of the seat. Although these crash blocking units which overcome a spring force only during the occurrence of decelerations above the triggering threshold, in order to pass into the blocked state, and are otherwise always returned under spring loading into the unblocked state, have significant practical advantages because of the reversibility of the blocking operation, they require particular consideration of the geometrical conditions in the event of a head on head position of the toothings and a precise coordination of the triggering threshold in order not to lead to annoying secondary effects during normal operation.

The vehicle seat according to the invention provides a solution to the overall problem by using a crash blocking unit which can be activated both by a deceleration in the event of a crash and also as a function of load without a complicated, movable point mounting of the belt together with cable transmission or Bowden cable transmission being required. In addition, the solution according to the invention is reversible and combines the advantages of the respective solutions known from the prior art.

One advantage of the vehicle seat according to the invention is that only relatively slight changes of the system in relation to the prior art, for example a vehicle seat known from WO 2004/074037 A1, are required in total because of the invention for inertia-controlled locking. Ultimately, only a change in the geometry of the pawl and an additional spring element are necessary in relation to the prior art. The change in geometry of the pawl consists in opening up the control groove on one side and in the addition of material at the greatest possible distance from an axis of rotation of the pawl, for example in an upper region of the pawl. For the load-dependent insertion of the pawl into a toothed segment, a journal which acts upon the control groove only on one side in the direction of the toothed segment is advantageous.

A rest position of the pawl during the normal driving mode is preferably achieved by means of a spring, in particular a compression spring. The latter can be arranged in a lower region of the pawl in the vicinity of the pivot point of the pawl. The spring preferably acts upon the pawl in such a manner that the control groove lies against the journal. As a result, the pawl is held in an inoperative position. During a deceleration of the vehicle, the pawl rotates about its pivot point, in particular a pawl bearing pin. In the process, the contact between the journal and the control groove is initially released, and the pawl engages in the toothing of the toothed segment as a function of the acceleration and therefore already blocks at a time at which the belt forces are still too low to bring about a load-dependent blocking (locking between pawl and toothed segment). If, for whatever reasons, said acceleration-dependent blocking should not occur, for example because of a head on head position of the toothings of pawl and toothed segment, locking is nevertheless achieved, specifically when the belt loads required for this purpose are reached. The pawl is therefore nevertheless forced into the closest possible blocking situation as a function of the load. The crash blocking unit constructed in such a manner has the advantage of very prompt locking of deceleration-activated crash blocking units in the same manner as the robustness of systems initiated as a function of load without being significantly more complicated.

The invention is explained in more detail below with reference to advantageous exemplary embodiments illustrated in the figures. However, the invention is not restricted to said exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
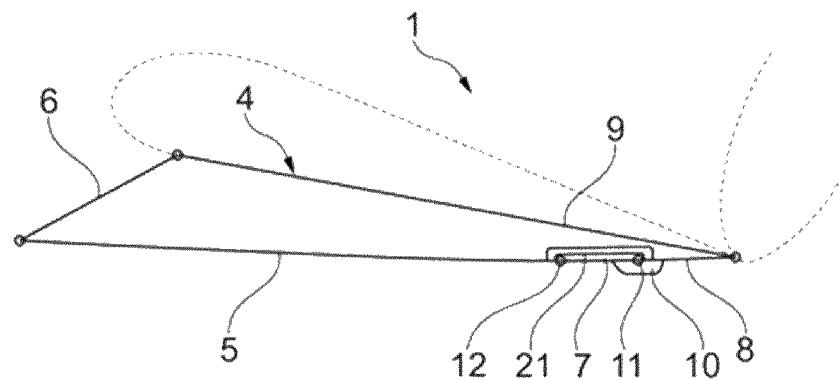
FIG. 1 is a schematic diagram of a vehicle seat known from the prior art with a crash blocking unit.
Figure 2:
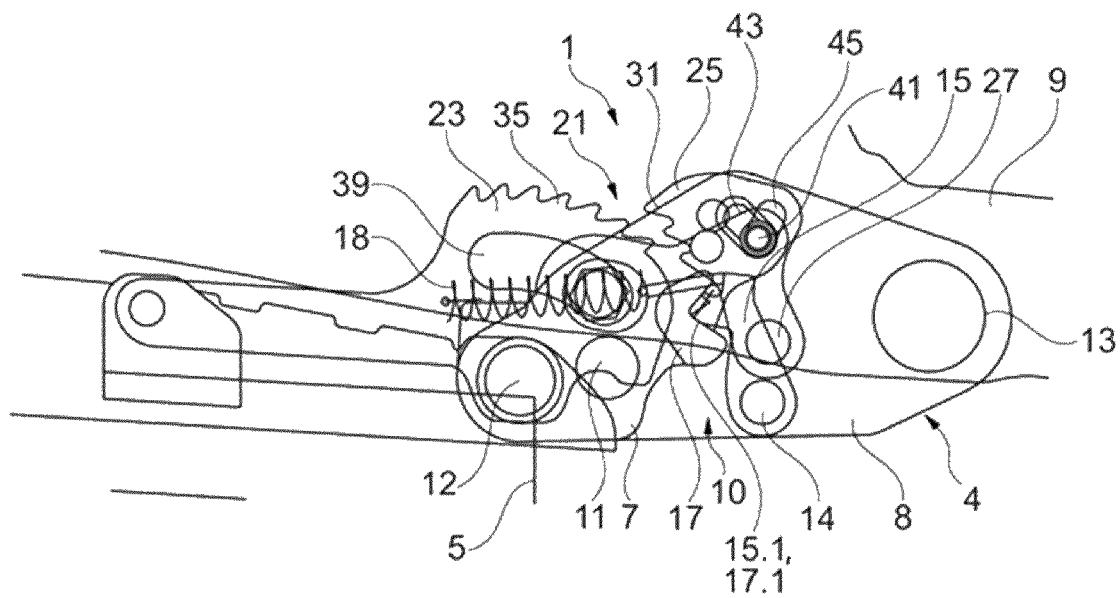
FIG. 2 is a schematic illustration of a vehicle seat known from the prior art in the region of a crash blocking unit, in a non-activated state of the crash blocking unit.
Figure 3:
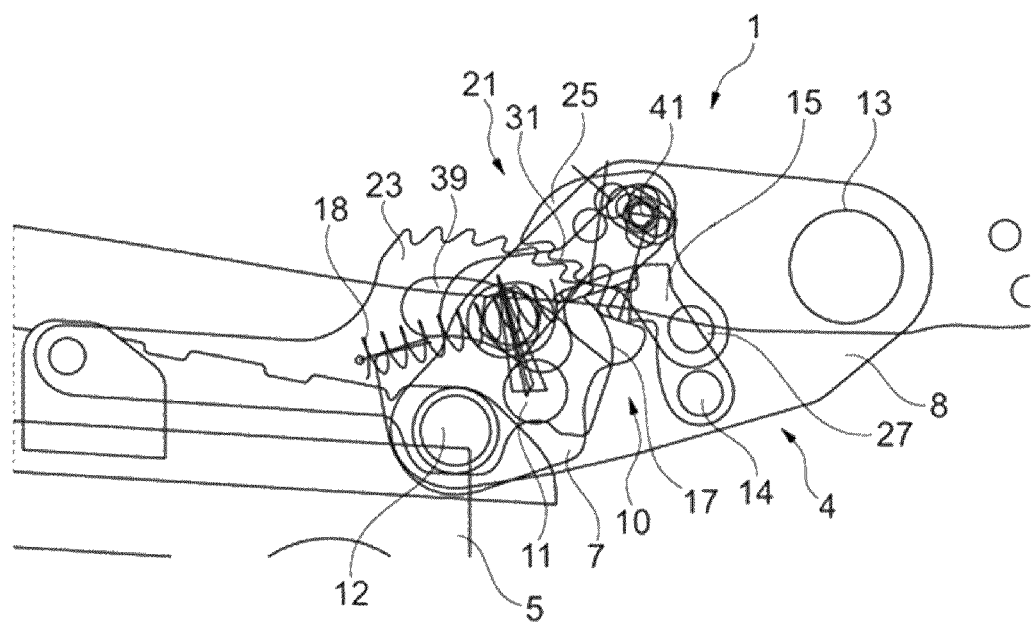
FIG. 3 is an illustration corresponding to FIG. 2 during the locking of the crash blocking unit.

Referring to the drawings, FIGS. 1 to 3 schematically illustrate a vehicle seat 1 as is known from the prior art and substantially corresponds to a vehicle seat known from WO 2004/074037 A1.

The vehicle seat 1 is height-adjustable and is provided for a motor vehicle. As height adjusters, use is made of multi-bar linkages on both sides of the vehicle seat, wherein, in the exemplary embodiment, the vehicle seat 1 is a front seat which can be installed on the left side of the vehicle, as viewed in the direction of travel. A four-bar linkage movable by motor is provided on the left side (sill side of the motor vehicle) and a multi-bar linkage 4 which is effective normally, i.e. apart from in the event of a crash, as a four-bar linkage is provided on the right side (tunnel side), said multi-bar linkage 4 having dimensions corresponding to the motor-driven four-bar linkage. On the right side, the vehicle seat 1 has a co-moving belt buckle. Co-moving means in the present case that, during a height adjustment of the vehicle seat 1, the belt buckle is correspondingly also moved vertically by means of the height adjuster, and therefore, in the event of a crash, belt forces have to be conducted via the height adjuster.

The multi-bar linkage 4 consists of five transmission links, namely a frame 5 to be connected in a manner fixed on the vehicle structure, in the present case an upper rail of a pair of seat rails serving as longitudinal adjuster, a front rocker 6 coupled to the frame 5, a control rocker 7 coupled at the rear to the frame 5, a carrier rocker 8 coupled to the control rocker 7, and a coupler 9 which is coupled to the front rocker 6 and the carrier rocker 8, in the present case a seat frame side part, to which the belt buckle is preferably also fastened. Normally, the control rocker 7 is rigidly connected here to the carrier rocker 8 by means of a locking unit 10 (described below). The multi-bar linkage 4 is therefore a five-bar linkage which, however, normally acts as a four-bar linkage because of the locking between control rocker 7 and carrier rocker 8. The carrier rocker 8 is coupled by means of a connecting pin 11 to the control rocker 7, the coupling of the control rocker 7 to the frame 5 takes place by means of a hinge pin 12, and a round transverse tube 13 which at the same time forms part of the seat frame serves as a coupling point between the carrier rocker 8 and the coupler 9. The carrier rocker 8 surrounds the hinge pin 12 with play by means of an elongated hole (not illustrated specifically).

The locking unit 10 for the rigid connection, which is normally present, between the control rocker 7 and the carrier rocker 8 has, on the carrier rocker 8 in a region behind the connecting pin 11, a locking bar 15 which is coupled by means of a locking-bar bearing pin 14 and grips in a counterpart 17 which is rigidly connected to the control rocker 7. The locking bar 15 here has a functional surface 15.1 which is relevant in the front crash. A spring 18 configured as a tension spring is suspended between the locking bar 15 and an angled portion of the carrier rocker 8, said angled portion being provided in front of the connecting pin 11. The spring 18 prestresses the locking bar 15 gripping into the counterpart 17, wherein the angles between the functional surface 15.1 and a corresponding abutment surface 17.1 of the counterpart 17 lie outside the self-locking range. The prestressing of the spring 18 defines a limit force, up to which the locking unit 10 is held with a force during the front crash, i.e. the control rocker 7 and the carrier rocker 8 are rigidly connected to each other.

A crash blocking unit 21 of the five-bar linkage 4, said crash blocking unit locking during the front crash, has a toothed segment 23 attached to the frame 5, and a pawl 25 which is mounted on the carrier rocker 8 by means of a pawl bearing pin 27 so as to be pivotable about a pawl axis of rotation 26. The pawl 25 which is of two-armed design and is arranged approximately vertically has a toothing region 31.

The toothed segment 23 which is curved about the hinge pin 12 and is arranged at a small distance from the pawl 25 is provided as a counter element to the pawl 25. The toothed segment 23 likewise has a region of teeth, namely a toothed segment region 35 which is configured to interact with the toothing region 31 of the pawl 25, i.e. is provided with correspondingly configured teeth.

During a pivoting movement of the control rocker 7 and of the carrier rocker 8, which is locked thereto, about the hinge pin 12, as occurs during a height adjustment of the vehicle seat 1, the toothing region 31 of the pawl 25 migrates along the toothed segment region 35. In order to be able to ensure an interaction at each adjustment of the five-bar linkage 4, the toothed segment region 35 is configured to be longer than the corresponding toothing region 31. For an improvement in the guidance, the connecting pin 11 projects through a guide slot 39 of the toothed segment 23, said guide slot being curved about the hinge pin 12.

For coupling between the pawl 25 and the control rocker 7, a journal 41 protrudes parallel to the hinge pin 12 at the upper end of the control rocker 7 that lies remote from the hinge pin 12, said journal gripping through an elongated hole 43 in the carrier rocker 8, and the other end of said journal being guided in a control groove 45 of the pawl 25. The elongated hole 43 permits the movability of the pin 41 that is necessary for the described functioning capability of the pawl 45.

In the event of a front crash, a torque which attempts to raise the multi-bar linkage 4 acts because of the force acting on the belt buckle and the blocking of the motor-driven four-bar linkage on the other side of the vehicle seat via the transverse tube 13. Said torque generates a counter torque on the hinge pin 12, which attempts to rotate the control rocker 7 relative to the carrier rocker 8. The spring 18 initially still holds the locking bar 15 in the counterpart 17, wherein the functional surface 15.1 attempts to pass out of the counterpart 17. As soon as the limit force is exceeded, the locking bar 18 comes free, and therefore the locking unit 10 opens and the rigid connection between the control rocker 7 and the carrier rocker 8 is cancelled. The multi-bar linkage 4 is now a genuine five-bar linkage which undergoes a small change in geometry because of the pivoting movement between carrier rocker 8 and control rocker 7.

This pivoting movement has the effect, via the coupling to the journal 41, that the pawl 25 is pivoted, which leads to a forcibly controlled meshing of the pawl 25 in the toothed segment 23. As a result, the carrier rocker 8 is locked to the frame 5 by the crash blocking unit 21, by bridging the control rocker 7, that is to say the multi-bar linkage 4 which is becoming a rigid three-bar linkage is blocked, and the entire system becomes stiffer. The crash loads can thus be conducted directly into the vehicle structure and therefore cause only a small deformation in the seat structure. On account on the small change in geometry, a belt connection point or belt buckle connection point provided in the region of the coupler 9 is only slightly shifted forward.

Figure 4:
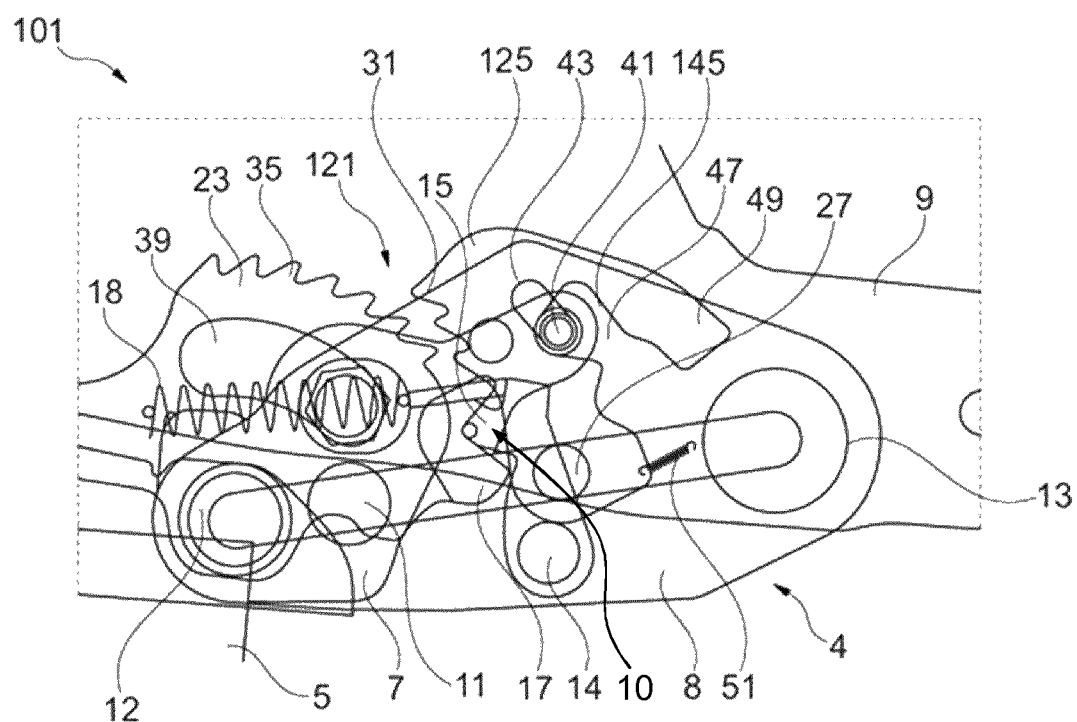
FIG. 4 shows a schematic illustration of a first exemplary embodiment of a vehicle seat according to the invention in the region of a crash blocking unit, in a non-activated state of the crash blocking unit.
Figure 5:
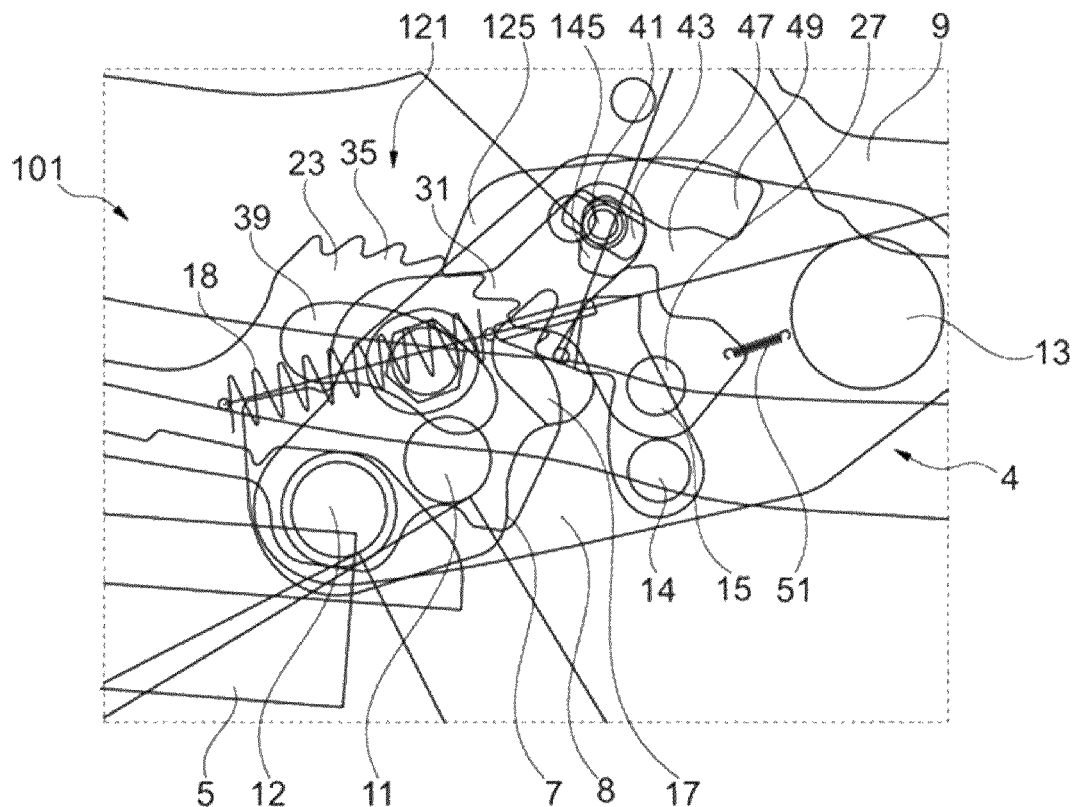
FIG. 5 is an illustration corresponding to FIG. 4, wherein the crash blocking unit is completely locked.
Figure 6:
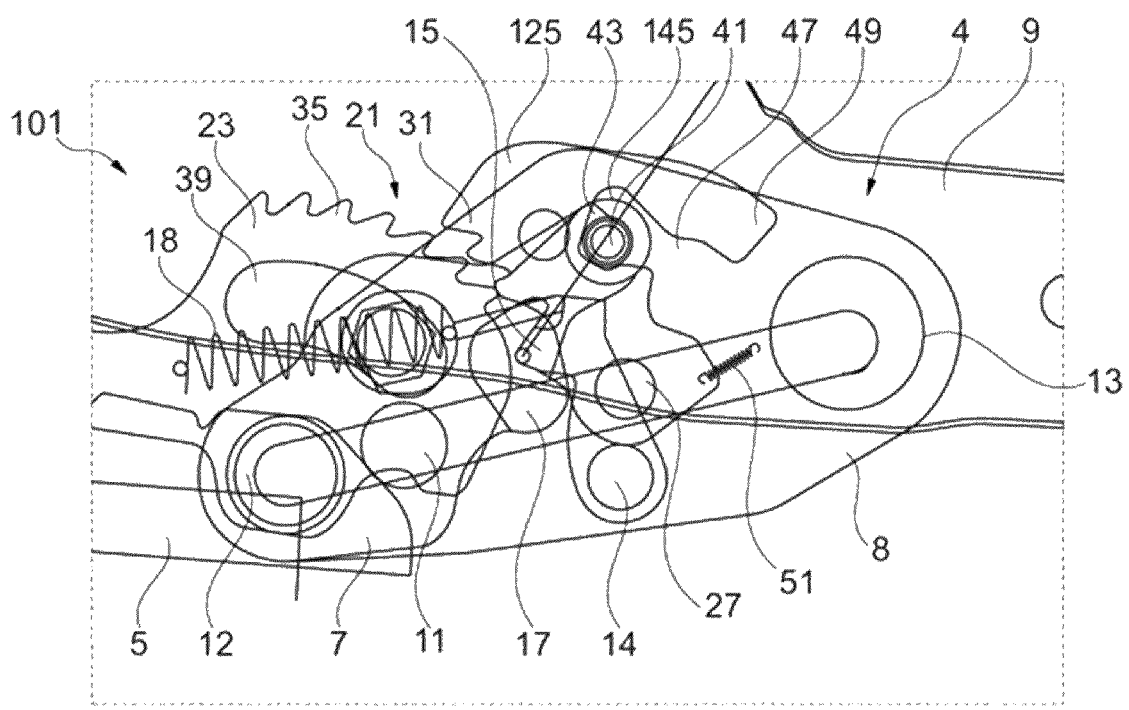
FIG. 6 is an illustration corresponding to FIG. 4 during the locking of the crash blocking unit.

FIGS. 4 to 6 show part of a first exemplary embodiment of a vehicle seat 101 according to the invention which, except for the components and functions described differently below, corresponds to the vehicle seat 1 which has previously been described with reference to FIGS. 1 to 3 and is known from the prior art. Components which are identical or have an identical effect therefore bear the same reference signs.

A crash blocking unit 121 of the five-bar linkage 4, which crash blocking unit locks during the front crash, has a toothed segment 23 attached to the frame 5, and a pawl 125 which is mounted on the carrier rocker 8 by means of a pawl bearing pin 27 so as to be pivotable about a pawl axis of rotation 26. The pawl 125 has a toothing region 31.

The pawl 125 which is configured differently from the prior art has a control groove 145 in which the journal 41 engages. The control groove 145 is open by means of an opening 47 in a direction facing away from the toothing region 31. As a result, in contrast to the previously described prior art, the pawl 125 is movable in a limited manner relative to the journal 41. A compression spring 51 pre-stresses the pawl 125 in one direction of rotation in such a manner that the toothing region 31 of the pawl 125 rotates away from the toothed segment region 35 of the toothed segment 23 until a boundary wall of the control groove 145, which boundary wall is opposite the toothing region 31, lies against the journal 41. This situation corresponds to the normal situation.

During a front crash, the pawl 125 pivots in the direction of meshing between the toothing region 31 of the pawl 125 and the toothed segment region 35 of the toothed segment 23 because of inertia forces of the pawl 125 and under pre-stressing of the compression spring 51. In the process, the journal 41 is released from the boundary wall of the control groove 145. The inertia forces of the pawl 125 are generated here by a center of gravity of the pawl 125 that is arranged eccentrically with respect to the pawl bearing pin 27. In order to increase the eccentricity between the pawl bearing pin 27 and the center of gravity of the pawl 125, the pawl has an additional mass 49 which is arranged radially on the outside with respect to the pawl bearing pin 27 and facing away from the toothing region 31. In the present case, the additional mass 49 is formed integrally with the pawl 125.

FIG. 4 shows the crash blocking unit 121 in a normal situation, in which the pawl 125 and the toothed segment 23 are not meshing. There are two possibilities for how the pawl 125 can enter into meshing with the toothed segment 23 during a front crash. The first possibility corresponds to the locking, which has previously been described in detail with reference to FIGS. 1 to 3, that is known from the prior art and takes place on account of a force acting on the belt buckle in the event of a front crash situation. The second possibility is the locking by means of the inertia forces of the pawl 125. Two different technical operative principles for locking the crash blocking unit 121 are therefore provided. During a front crash, the inertia forces can already lock the pawl 125 in the time sequence before the forces on the belt buckle are of a size sufficient in order to release the locking bar 15 from the counterpart 17 and, as a result, to ultimately pivot the pawl 125 by means of the journal 41.

FIG. 5 shows a locked state of the crash blocking unit 121, in which the pawl 125 has completely locked to the toothed segment 23. Depending on the type and direction of the front crash, the sequence of movement during the front crash can vary: the toothing region of the pawl 125 can first of all in terms of time engage in the toothed segment region 35 of the toothed segment 23 because of the inertia forces and then the journal 41 can move. However, it is also possible for both operative principles to take place approximately at the same time.

FIG. 6 shows a further possible state during a front crash. The toothing region 31 of the pawl 125 is in a position relative to the toothed segment region 35 of the toothed segment 23, in which the tooth tips of the toothings stand on one another and, as a result, meshing only because of the inertia forces is not possible. In this case, after a slight deformation of the vehicle seat 101 because of the belt forces and a resulting relative movement between pawl 125 and toothed segment 23, the journal 41 will bring the pawl 125 into complete meshing with the toothed segment 23.

Figure 7:
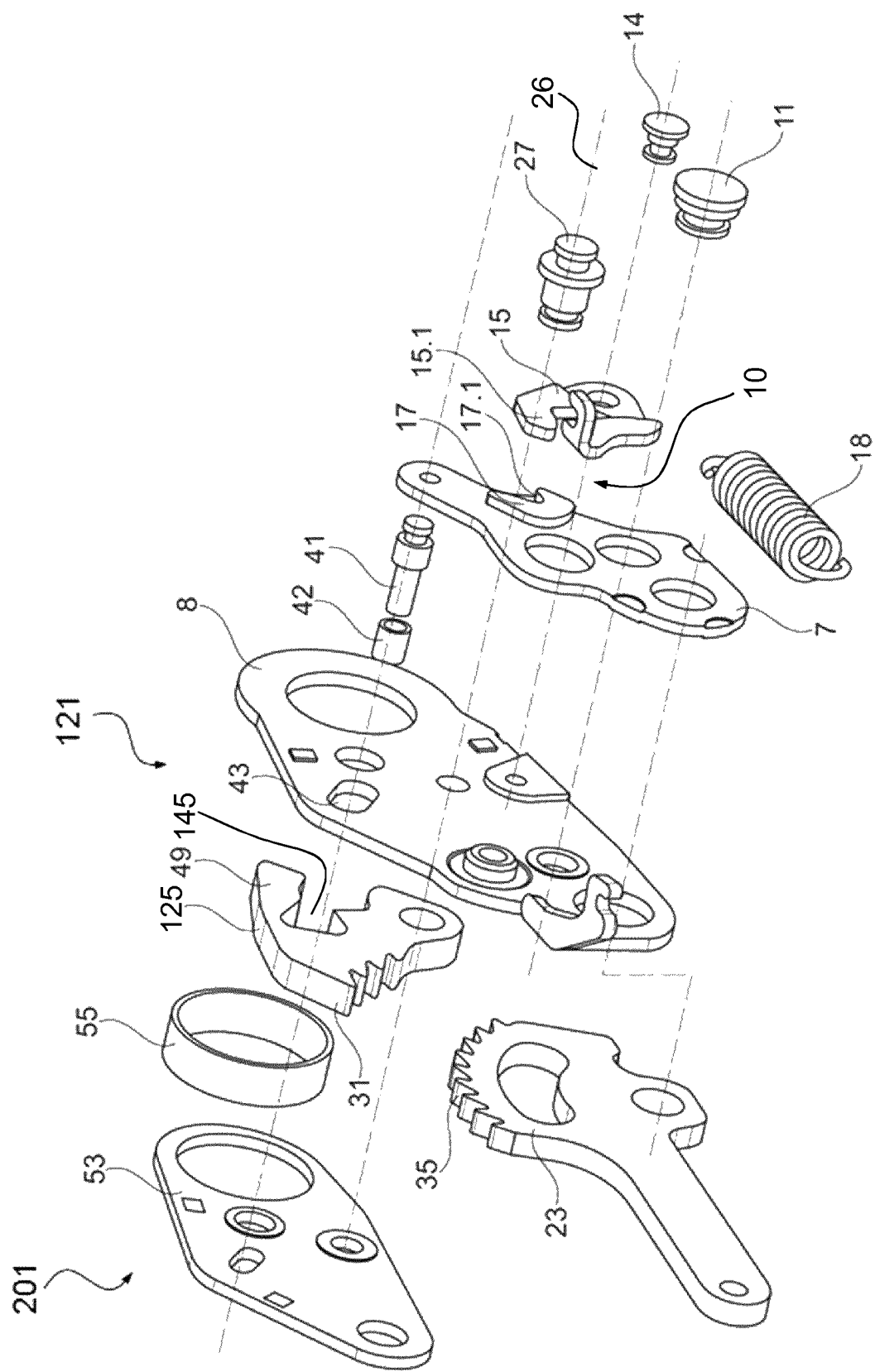
FIG. 7 is a view of parts of a perspective exploded illustration of a second exemplary embodiment of a vehicle seat according to the invention.

FIG. 7 shows a second exemplary embodiment of a vehicle seat 201 according to the invention that, except for the components and functions described differently below, corresponds to the vehicle seat 101 of the first exemplary embodiment that has previously been described with reference to FIGS. 4 to 6. To explain the components of identical effect and the same functions, reference is therefore made to the description of the first exemplary embodiment. In addition, components which are identical or have an identical effect bear the same reference signs as in the first exemplary embodiment.

A carrier rocker 8 of the vehicle seat 201 is reinforced by means of a reinforcing plate 53. The reinforcing plate 53 is arranged parallel to the carrier rocker 8. The reinforcing plate 53 is arranged spaced apart from the carrier rocker 8. A spacer ring 55 connects the carrier rocker 8 to the reinforcing plate 53. The spacer ring 55 is cylindrical. A center axis of the spacer ring runs parallel to the axis of rotation of the pawl 125. The carrier rocker 8 lies against a first end of the spacer ring 55 and is welded thereto. The reinforcing plate 53 lies against the other end of the spacer ring 55 and is welded thereto. The pawl 125 is arranged in the axial direction between the carrier rocker 8 and the reinforcing plate 53. In addition, the toothed segment 23 is arranged in the axial direction between the carrier rocker 8 and the reinforcing plate 53. The term axially relates to the pawl axis of rotation 26.

A journal 41 is a component formed separately from the control rocker 7. The journal 41 is riveted to the control rocker 7. The journal 41 bears a bushing 42 which is preferably composed of a plastic. A compression spring (not illustrated in FIG. 7) prestresses the pawl 125 in one direction of rotation in such a manner that a toothing region 31 of the pawl 125 rotates away from a toothed segment region 35 of a toothed segment 23 until a boundary wall of the control groove 145 of the pawl 125, said boundary wall lying opposite the toothing region 31, lies against the bushing 42 of the journal 41. This situation corresponds to the normal situation. With regard to the sequences in the event of a front crash, the second exemplary embodiment coincides with the first exemplary embodiment. In particular, the crash blocking unit 121 is lockable by the inertia-controlled pawl 125 independently of a load-controlled unlocking of the locking unit 10.

The features disclosed in the above description, the claims and the drawings can be important both individually and in combination in order to realize the invention in its various configurations.

Although the invention has been described in detail in the drawings and in the illustration above, the illustrations should be understood as being illustrative and exemplary, and not as restrictive. In particular, the selection of the proportions of the individual elements illustrated in the drawings should not be interpreted as being necessary or restrictive. Furthermore, the invention is in particular not restricted to the exemplary embodiments discussed. Further variants of the invention and their embodiment will be apparent to a person skilled in the art from the above disclosure, from the figures and from the claims.

While specific embodiments of the invention have been shown and described in detail to illustrate the application of the principles of the invention, it will be understood that the invention may be embodied otherwise without departing from such principles.

The invention claimed is:

1. A vehicle seat comprising:
a locking unit;
at least one multi-bar linkage for adjusting the seat height, said multi-bar linkage being defined by at least five transmission links, wherein, during normal operation of the vehicle seat, the multi-bar linkage is effective as a four-bar linkage because of the locking unit being effective between at least two transmission links of the at least five transmission links; and
a crash blocking unit locking at least one frame, which is fixed on the vehicle structure, and a rocker, as two of the at least five transmission links, to each other such that the multi-bar linkage acts as a three-bar linkage, wherein:
a further transmission link of the at least five transmission links is arranged between the frame and the rocker;
in the event of a crash, because of a load-controlled unlocking of the locking unit the multi-bar linkage can initially act as a five-bar linkage, as a result of which locking of the crash blocking unit can be triggered;
the crash blocking unit is lockable by an inertia-controlled pawl of the crash blocking unit independently of a load-controlled unlocking of the locking unit;
during normal operation of the vehicle seat, the locking unit locks a carrier rocker as said rocker and a control rocker as said further transmission link, which is mounted rotatably with respect to the carrier rocker, to each other;
the control rocker has a journal which engages in a control groove of the pawl;
the pawl is mounted on the carrier rocker so as to be rotatable about the pawl axis of rotation;
when the locking unit is unlocked, the carrier rocker is rotatable relative to the control rocker;
a rotation of the carrier rocker in at least one direction of rotation relative to the control rocker brings about meshing engagement of the pawl with the toothed segment; and
the pawl is decoupled from the journal in a pivoting direction which leads to meshing engagement between the toothing region of the pawl and a toothed segment region of the toothed segment.

2. The vehicle seat as claimed in claim 1, wherein the pawl has a toothing region which, under load control, can be brought into meshing engagement with a toothed segment fastened to the frame.

3. The vehicle seat as claimed in claim 2, wherein the pawl has a toothing region which, under inertia control, can be brought into meshing engagement with the toothed segment fastened to the frame.

4. The vehicle seat as claimed in claim 1, wherein the pawl is mounted rotatably about a pawl axis of rotation.

5. The vehicle seat as claimed in claim 1, wherein the rocker is a carrier rocker.

6. The vehicle seat as claimed in claim 5, wherein the pawl is mounted on the carrier rocker so as to be rotatable about the pawl axis of rotation.

7. The vehicle seat as claimed in claim 1, wherein the mass center of gravity of the pawl is arranged eccentrically with respect to a pawl axis of rotation of the pawl.

8. The vehicle seat as claimed in claim 1, wherein the control groove is opened by an opening in a direction facing away from a toothing region.

9. The vehicle seat as claimed in claim 1, wherein the pawl is arranged axially between the carrier rocker and a reinforcing plate.

10. The vehicle seat as claimed in claim 9, wherein the reinforcing plate is connected fixedly to the carrier rocker.

11. The vehicle seat as claimed in claim 1, wherein the pawl has an additional mass which is formed integrally with the pawl.

* * * * *